United States Patent
Roos et al.

(10) Patent No.: US 9,956,848 B2
(45) Date of Patent: May 1, 2018

(54) SYSTEM AND METHOD FOR HEATING A VEHICLE CABIN

(75) Inventors: Bryan Nathaniel Roos, West Bloomfield, MI (US); Eugene V. Gonze, Pinckney, MI (US); Halim G. Santoso, Novi, MI (US); Brian L. Spohn, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1952 days.

(21) Appl. No.: 13/280,384

(22) Filed: Oct. 25, 2011

(65) Prior Publication Data

US 2013/0099012 A1   Apr. 25, 2013

(51) Int. Cl.
| | |
|---|---|
| *B60H 1/00* | (2006.01) |
| *B60H 1/20* | (2006.01) |
| *B60L 1/02* | (2006.01) |
| *B60L 11/02* | (2006.01) |
| *B60L 11/18* | (2006.01) |

(52) U.S. Cl.
CPC .............. *B60H 1/20* (2013.01); *B60L 1/02* (2013.01); *B60L 11/02* (2013.01); *B60L 11/1862* (2013.01); *B60L 2240/34* (2013.01); *B60L 2240/36* (2013.01); *Y02T 10/70* (2013.01); *Y02T 10/7005* (2013.01); *Y02T 10/705* (2013.01);
(Continued)

(58) Field of Classification Search
CPC .......... B60H 1/20; B60H 1/18; B60H 1/2209; B60H 2001/2271; B60H 2001/2296
USPC ..................... 237/12.3 C; 165/202
See application file for complete search history.

(56) References Cited

U.S. PATENT DOCUMENTS

| | | | | | |
|---|---|---|---|---|---|
| 2,222,537 | A | * | 11/1940 | Law | 237/12.3 B |
| 5,082,174 | A | * | 1/1992 | Joji | 237/12.3 A |

(Continued)

FOREIGN PATENT DOCUMENTS

| | | |
|---|---|---|
| CN | 102207046 A | 10/2011 |
| DE | 3920159 A1 | 1/1991 |

(Continued)

OTHER PUBLICATIONS

Mashita et al., JPH09125939A English machine translation, May 13, 1997.*

(Continued)

*Primary Examiner* — Alissa Tompkins
*Assistant Examiner* — Phillip E Decker
(74) *Attorney, Agent, or Firm* — Quinn IP Law

(57) ABSTRACT

A method of heating a cabin of a motor vehicle that includes an internal combustion engine operatively connected to an exhaust system having a catalyst, and a heating, ventilation, and air conditioning (HVAC) system is provided. The method includes detecting a request to increase temperature inside the cabin, supplying fuel and air to the engine, and motoring the engine to pump the fuel and air into the exhaust system. The method also includes heating the catalyst to combust the fuel and air inside the catalyst such that a stream of post-combustion exhaust gas is generated. The method additionally includes channeling the generated stream of post-combustion exhaust gas to the HVAC system such that a temperature of a coolant circulated through the HVAC system is increased to heat the cabin. A system configured to perform the above method is also disclosed.

20 Claims, 1 Drawing Sheet

(52) U.S. Cl.
CPC ........ *Y02T 10/7044* (2013.01); *Y02T 10/7077* (2013.01)

(56) References Cited

U.S. PATENT DOCUMENTS

| | | | | |
|---|---|---|---|---|
| 5,340,020 | A * | 8/1994 | Maus et al. | 237/12.3 C |
| 5,941,220 | A * | 8/1999 | Kuhn | 237/12.3 B |
| 6,397,963 | B1 * | 6/2002 | Lennevi | 180/65.235 |
| 6,464,027 | B1 * | 10/2002 | Dage et al. | 237/12.3 B |
| 7,621,262 | B2 * | 11/2009 | Zubeck | 123/543 |
| 7,654,312 | B2 * | 2/2010 | Baeuerle et al. | 237/12.3 B |
| 7,823,798 | B2 * | 11/2010 | Le Lievre | 237/12.3 B |
| 8,600,615 | B2 * | 12/2013 | Martini et al. | 701/36 |
| 2004/0079342 | A1 * | 4/2004 | Kojima et al. | 123/491 |
| 2004/0144107 | A1 * | 7/2004 | Breton et al. | 62/129 |
| 2005/0172618 | A1 * | 8/2005 | Sasaki | 60/300 |
| 2006/0260853 | A1 * | 11/2006 | Ando et al. | 180/65.3 |
| 2008/0006711 | A1 * | 1/2008 | Ishida et al. | 237/12.3 R |
| 2008/0125934 | A1 * | 5/2008 | Chen et al. | 701/36 |
| 2008/0217083 | A1 | 9/2008 | Serkh et al. | |
| 2008/0236912 | A1 * | 10/2008 | Ueoka et al. | 701/51 |
| 2008/0277176 | A1 * | 11/2008 | Akimoto | 701/29 |
| 2009/0064696 | A1 * | 3/2009 | Perkins | 62/244 |
| 2010/0012295 | A1 * | 1/2010 | Nemesh et al. | 165/104.19 |
| 2010/0145562 | A1 * | 6/2010 | Moran | 701/22 |
| 2010/0212981 | A1 * | 8/2010 | Roos et al. | 701/113 |
| 2011/0083426 | A1 * | 4/2011 | Ikemoto et al. | 60/286 |
| 2012/0103283 | A1 * | 5/2012 | Mehring et al. | 165/41 |
| 2012/0204536 | A1 * | 8/2012 | Gonze | F01N 3/2026 180/65.27 |
| 2012/0290161 | A1 * | 11/2012 | Takeda et al. | 701/22 |
| 2014/0007561 | A1 * | 1/2014 | Habu et al. | 60/277 |

FOREIGN PATENT DOCUMENTS

| | | | | |
|---|---|---|---|---|
| JP | 09125939 | A | | 5/1997 |
| JP | 2002188481 | A * | 7/2002 | ............ F02D 29/02 |
| JP | 2002242751 | A * | 8/2002 | ............ F02D 45/00 |
| JP | 2002256919 | A * | 9/2002 | ............ F02D 29/02 |
| WO | 9747865 | A1 | | 12/1997 |

OTHER PUBLICATIONS

Definition of "motor", verb, Oxford English Dictionary, Oxford University Press 2015.*

* cited by examiner

SYSTEM AND METHOD FOR HEATING A VEHICLE CABIN

TECHNICAL FIELD

The present disclosure is drawn to a system and a method for heating a cabin of a motor vehicle.

BACKGROUND

A majority of modern vehicles employ internal combustion engines for propulsion. Additionally, in search of reduced exhaust emissions, as well as for improved fuel efficiency, an internal combustion engine may be combined with one or more electric motor-generators to form a hybrid powertrain. Similarly, for reduced exhaust emissions and improved fuel efficiency, the subject internal combustion engine may be equipped with start-stop capability.

Start-stop capability allows the engine to be automatically shut off when engine power is not required to drive the vehicle and then be automatically restarted when engine power is again requested. Generally, start-stop capability reduces the engine's emissions and improves the vehicle's overall fuel efficiency since the engine does not consume fuel or produce post-combustion exhaust when the engine is shut off. However, when the engine is thus shut off, it does not generate energy that may otherwise be used to heat a passenger compartment of the subject vehicle.

SUMMARY

A method is provided for heating a cabin or a passenger compartment of a motor vehicle that includes an internal combustion engine operatively connected to an exhaust system having a catalyst, and a heating, ventilation, and air conditioning (HVAC) system. The method includes detecting a request to increase temperature inside the cabin, supplying fuel and air to the engine, and motoring the engine to pump the fuel and air into the exhaust system. The method also includes heating the catalyst to combust the fuel and air inside the catalyst such that a stream of post-combustion exhaust gas is generated. The method additionally includes channeling the generated stream of post-combustion exhaust gas to the HVAC system such that a temperature of a coolant circulated through the HVAC system is increased to heat the cabin.

The HVAC system may include a liquid-to-air heat exchanger and the act of channeling of the generated stream of post-combustion exhaust gas may be accomplished to the heat exchanger.

The vehicle may additionally include a motor-generator and the method may additionally include powering the vehicle via the motor-generator. In such a case, the act of motoring the engine may be accomplished via the motor-generator.

The vehicle may additionally include an electric heating element and the act of heating the catalyst may be accomplished via the heating element.

The coolant circulated through the HVAC system may be that of engine coolant.

The engine may include an automatic start-stop capability. In such a case, the method may additionally include starting the engine to combust the fuel and air inside the engine for powering the vehicle after heating the catalyst and combusting the fuel and air inside the catalyst.

The vehicle may additionally include a controller. Accordingly, each of the acts of detecting the request to increase temperature inside the cabin, supplying the fuel and air to the engine, motoring the engine, heating the catalyst, channeling the generated stream of post-combustion exhaust gas to the HVAC system, and starting the engine may be accomplished via the controller.

The vehicle may additionally include an energy-storage device. Accordingly, the method may additionally include determining a state of charge (SOC) of the energy-storage device via the controller. Furthermore, each of the acts of supplying the fuel and air to the engine, motoring the engine, heating the catalyst, channeling the generated stream of post-combustion exhaust gas to the HVAC system may be accomplished when the SOC is below a predetermined value.

The vehicle may additionally include an electric heater configured to supply heat to the cabin. In such a case, the method may additionally include supplying heat to the cabin via the electric heater when the SOC of the energy-storage device is above the predetermined value and ceasing to supply heat to the cabin via the electric heater when the SOC of the energy-storage device is below the predetermined value.

A system configured to perform the above method is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
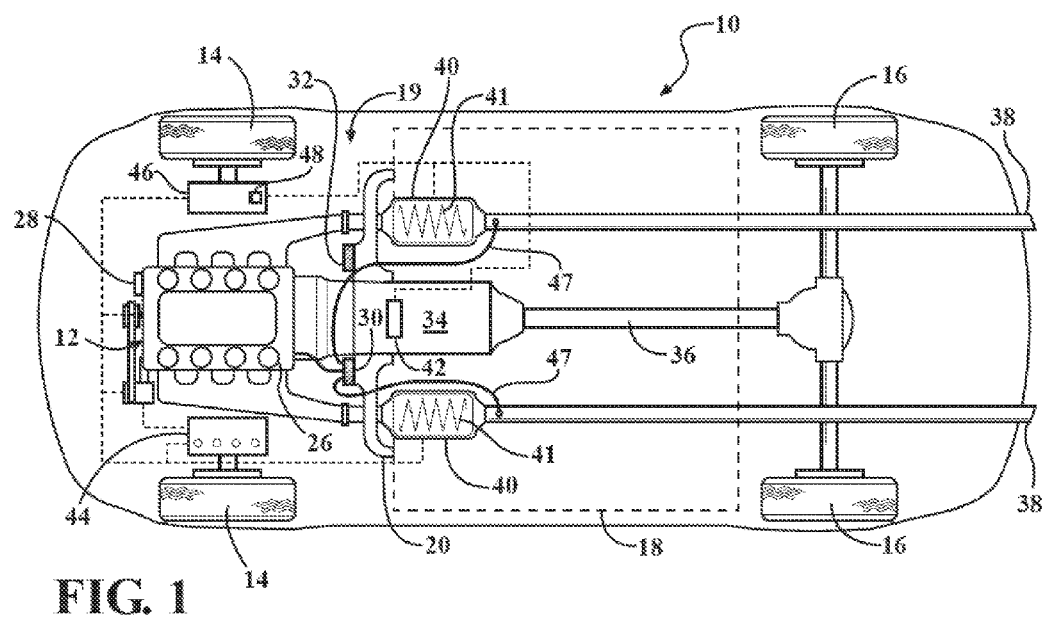
FIG. 1 is a schematic plan view of a hybrid vehicle using an internal combustion engine for heating the vehicle's cabin.

Referring to the drawings, wherein like reference numbers refer to like components, FIG. 1 shows a schematic view of a hybrid electric vehicle (HEV) 10. The HEV 10 includes an internal combustion engine 12, such as a spark or a compression ignition type engine, configured to generate power and adapted for driving wheels 14 and/or wheels 16 to propel the vehicle. Although a hybrid electric vehicle is shown, any vehicle employing an internal combustion engine is envisioned.

The HEV 10 also includes a passenger compartment or cabin 18. Furthermore, the HEV 10 includes a system 19 configured for heating the cabin 18. The engine 12 is part of the system 19 in that the engine is employed by the system for heating the cabin 18. The system 19 also includes a heating, ventilation, and air conditioning (HVAC) system 20 for regulating a flow of air at a selected temperature into and through the passenger compartment to establish a desired temperature inside the cabin 18.

The engine 12 is characterized by a start-stop capability, which includes an automatic engine shut-off and an automatic fuel cut-off. During a start-stop maneuver, the engine 12 is automatically shut off when engine power is not necessary to drive the HEV 10. Engine start-stop may be used to shut off the engine 12 in a situation when the HEV 10 comes to a brief stop and then be used to automatically restart the engine as the vehicle operator releases the brakes (not shown). Additionally, the start-stop capability allows the engine 12 to be shut off and motored by vehicle inertia during deceleration of the HEV 10 for improved fuel efficiency of the HEV, and then be automatically restarted when acceleration of the HEV is again desired. Generally, a supply of fuel and air is delivered to cylinders 26 of the engine 12 when the engine is running.

The start-stop capability of the engine 12 includes an automatic cut-off of fuel to the cylinders 26 when the engine is not running The engine 12 may also be motored or spun via a separate or external source when a supply of fuel to the engine is shut off and no combustion takes place in the cylinders 26. Typically, when the engine is thus motored, the internal rotating components, such as the crankshaft, valves, and pistons (none of which are shown, but the existence of which would be appreciated by those skilled in the art) of the subject engine remain in motion. Consequently, the cylinders of the motored engine continue to generate vacuum, and then draw in, compress, and pump out air. Accordingly, because the subject engine does not burn fuel or generate combustion forces, the overall efficiency of the host vehicle is improved. The supply of fuel is resumed to the cylinders 26 when the engine 12 is to be restarted.

As shown in FIG. 1, the engine 12 includes a fluid pump 28 configured to supply a pressurized cooling fluid or coolant and circulate such coolant throughout the engine to remove heat when the engine is running. The increased temperature engine coolant is then circulated through the HVAC system 20. The HVAC system 20 in turn uses the increased temperature engine coolant to heat the cabin 18 by having the coolant pass through a liquid-to-air heat exchanger 30 and directing thus heated air into the cabin. As also shown in FIG. 1, the HVAC system 20 may include an electric heater 32. The heater 32 is configured to supply thermal energy to the air entering the cabin 18 from the ambient in order to more rapidly achieve a desired temperature inside the cabin, especially when the engine 12 has not yet come up to operating temperature.

The engine 12 transmits power to the driven wheels 14 and/or 16 through a transmission 34 via a drive or a propeller shaft 36 for driving HEV 10. During operation, the engine 12 emits post-combustion gases to the ambient via an exhaust system 38. The exhaust system 38 includes catalytic converters 40 that are employed to reduce toxicity of the emitted exhaust gases prior to the gases entering the atmosphere, as understood by those skilled in the art. Accordingly, start-stop capability of the engine 12 also permits reduction of the exhaust gases into the atmosphere when engine power is not required to drive the HEV 10. Although two catalysts 40 are shown, the actual number of catalysts employed by the HEV 10 is generally dependent on the configuration of the engine 12, as understood by those skilled in the art. The system 19 also includes electric heating elements 41. Each heating element 41 is operatively connected to one of the catalytic converters 40 and is configured to heat the respective catalytic converter. The heating elements 41 are capable of generating temperatures above 300 degrees Celsius, which is sufficient to ignite the air and fuel mixture inside the catalysts 40.

Still referring to FIG. 1, the system 19 additionally includes a motor-generator 42 configured to generate electrical power for driving the HEV 10, and additionally supply such power to various electrical devices of the HEV. The motor-generator 42 is also configured to motor the engine 12 or quickly and automatically restart engine 12 after the engine has been briefly shut off during a start-stop maneuver. Although a single motor-generator 42 is shown, a great number of motor-generators may be employed depending on the actual configuration of the HEV 10. The motor-generator 42 is configured to supply energy to an energy-storage device 44, such as one or more batteries, when the engine 12 is running. The energy-storage device 44 typically also supplies electrical energy to power the HVAC system 20 and other miscellaneous vehicle accessories, such as vehicle exterior and interior lighting (not shown). The energy-storage device 44 is configured to selectively store energy, and to release the stored energy as required during operation of the HEV 10.

The system 19 additionally includes a controller 46 having a tangible non-transitory memory. The controller 46 is adapted to regulate operation of the engine 12, transmission 34, motor-generator 42, and energy-storage device 44. The controller 46 is configured to regulate heating of the cabin 18 by detecting a request from the operator of the HEV 10 to increase temperature inside the cabin. A request to achieve the predetermined temperature inside the cabin 18 occurs when the actual cabin temperature is below the desired cabin temperature. The controller 46 is also configured to supply fuel and air to the cylinders 26 and direct the motor-generator 42 to motor the engine without combusting the mixture inside the cylinders 26. Such motoring of the engine 12 serves to pump the fuel and air via the cylinders 26 into the exhaust system 38.

The controller 46 is additionally configured to heat the catalysts 40 by activating the heating elements 41 to thereby combust within each respective catalyst the mixture of fuel and air that was pumped into the exhaust system 38 and thereby heat the catalysts. Accordingly, the heating elements 41 turn the catalysts 40 into "catalytic combustors" and are used to burn or combust the fuel and air inside the catalysts and generate a stream of post-combustion exhaust gas. Furthermore, the controller 46 is configured to channel the generated stream of post-combustion exhaust gas via conduits 47 to the heat exchanger 30 and increase the temperature of the engine coolant being circulated through the heat exchanger. The increased temperature of the engine coolant in turn increases the temperature of the air being passed over and through the heat exchanger 30 and the increased temperature air is then used to heat the cabin 18. Because the engine coolant is only heated inside the heat exchanger 30, the entire mass of the engine 12 does not require to be brought up to the required temperature by the post-combustion exhaust gas along with the coolant. Accordingly, the temperature of the engine coolant is increased more rapidly than would be possible if the coolant was heated directly inside the engine 12.

The controller 46 may be additionally configured to start the engine 12 and combust an additional supply of fuel and air inside the cylinders 26 for powering the HEV 10 after the heating elements 41 have caused the mixture of fuel and air to be combusted inside the catalysts 40. Accordingly, such starting of the engine 12 after the catalysts 40 have already been pre-heated via combustion of the fuel and air mixture therein decreases the exhaust emissions from the engine upon cold start up.

The controller 46 may also be configured to determine a state of charge (SOC) of the energy-storage device 44, regulate supply of the fuel and air to the cylinders 26, motor the engine, heat the catalysts 40, and channel the generated stream of post-combustion exhaust gas to the HVAC system 20 when the SOC is below a predetermined value 48. Accordingly, the predetermined value 48 is stored within the memory of the controller 46. The predetermined value 48 of the SOC of the energy-storage device 44 may be representative of a minimum SOC below which the energy-storage device is incapable of supplying sufficient electrical energy to the heater 32 without incurring damage. Accordingly, the electric heater 32 may supply heat to the cabin 18 when the SOC of the energy-storage device 44 is above the predetermined value 48 and cease supplying heat to the cabin when the SOC of the energy-storage device is below the predetermined value.

Figure 2:
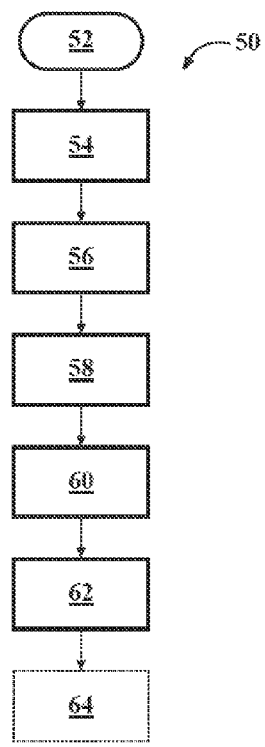
FIG. 2 is a flow chart illustrating a method of heating the cabin in the vehicle depicted in FIG. 1.

FIG. 2 depicts a method 50 of heating the cabin 18 in the HEV 10, as described above with respect to FIG. 1. The method commences in frame 52 with the HEV 10 being activated by the vehicle operator. From frame 52, the method proceeds to frame 54 where the method includes detecting a request to increase temperature inside the cabin 18. After frame 54, the method advances to frame 56 where the method includes supplying fuel and air to the cylinders 26. Following frame 56, the method moves on to frame 58. In frame 58, the method includes motoring the engine 12 to pump the fuel and air into the exhaust system 38.

After frame 58, the method proceeds to frame 60 where the method includes heating the catalysts 40 via the heating elements 41 to combust the fuel and air inside the catalysts such that a stream of post-combustion exhaust gas is generated. From frame 60, the method proceeds to frame 62 where the method includes channeling the generated stream of post-combustion exhaust gas to the HVAC system 20 such that the temperature of the coolant circulated through the HVAC system is increased to heat the cabin 18. After frame 62, the method may advance to frame 64 where the method includes starting the engine 12 to combust the fuel and air inside the cylinders 26 for powering the HEV 10 after the catalysts 40 were heated via the heating elements 41 and the fuel and air were combusted inside the catalysts.

While the best modes for carrying out the invention have been described in detail, those familiar with the art to which this invention relates will recognize various alternative designs and embodiments for practicing the invention within the scope of the appended claims.

The invention claimed is:

1. A method of heating a cabin of a motor vehicle having an internal combustion engine operatively connected to an exhaust system having a catalyst, a controller, and a heating, ventilation, and air conditioning (HVAC) system, the method comprising:
    detecting a request to increase temperature inside the cabin;
    supplying fuel and air to the engine;
    motoring the engine to pump the fuel and air into the exhaust system;
    heating, via the controller, the catalyst to combust the fuel and air inside the catalyst such that a stream of post-combustion exhaust gas is generated; and
    channeling, via the controller, the generated stream of post-combustion exhaust gas to the HVAC system such that a temperature of a coolant circulated through the HVAC system is increased to heat the cabin.

2. The method of claim 1, wherein the HVAC system includes a liquid-to-air heat exchanger and said channeling the generated stream of post-combustion exhaust gas is accomplished to the heat exchanger.

3. The method of claim 1, wherein the vehicle additionally includes a motor-generator, the method further comprising powering the vehicle via the motor-generator.

4. The method of claim 3, wherein said motoring the engine is accomplished via the motor-generator.

5. The method of claim 1, wherein the vehicle additionally includes an electric heating element, and wherein said heating the catalyst is accomplished via the heating element.

6. The method of claim 1, wherein the coolant circulated through the HVAC system is engine coolant.

7. The method of claim 1, wherein the engine includes an automatic start-stop capability, the method further comprising starting the engine to combust the fuel and air inside the engine for powering the vehicle after said heating the catalyst and combusting the fuel and air inside the catalyst.

8. The method of claim 7, wherein each of said detecting the request to increase temperature inside the cabin, supplying the fuel and air to the engine, motoring the engine, and starting the engine is accomplished via the controller.

9. The method of claim 8, wherein the vehicle additionally includes an energy-storage device, the method further comprising:
    determining a state of charge (SOC) of the energy-storage device via the controller; and
    accomplishing each of said supplying the fuel and air to the engine, motoring the engine, heating the catalyst, and channeling the generated stream of post-combustion exhaust gas to the HVAC system when the SOC is below a predetermined value.

10. The method of claim 9, wherein the vehicle additionally includes an electric heater configured to supply heat to the cabin, the method further comprising:
    supplying heat to the cabin via the electric heater when the SOC of the energy-storage device is above the predetermined value; and
    ceasing to supply heat to the cabin via the electric heater when the SOC of the energy-storage device is below the predetermined value.

11. A system for heating a cabin of a motor vehicle, the system comprising:
    an internal combustion engine operatively connected to an exhaust system having a catalyst;
    a heating ventilation and air conditioning (HVAC) system; and
    a controller configured to:
        detect a request to increase temperature inside the cabin;
        supply fuel and air to the engine;
        motor the engine to pump the fuel and air into the exhaust system;
        heat the catalyst to combust the fuel and air inside the catalyst such that a stream of post-combustion exhaust gas is generated; and
        channel the generated stream of post-combustion exhaust gas to the HVAC system such that a temperature of a coolant circulated through the HVAC system is increased to heat the cabin.

12. The system of claim 11, wherein the HVAC system includes a liquid-to-air heat exchanger and the generated stream of post-combustion exhaust gas is channeled to the heat exchanger.

13. The system of claim 11, further comprising a motor-generator regulated by the controller to motor the engine and configured to power the vehicle.

14. The system of claim 11, further comprising an electric heating element regulated by the controller to heat the catalyst.

15. The system of claim 11, wherein the coolant circulated through the HVAC system is engine coolant.

16. The system of claim 11, wherein the engine includes an automatic start-stop capability and the controller is additionally configured to start the engine to combust the fuel and air inside the engine for powering the vehicle after the catalyst is heated and the fuel and air are combusted inside the catalyst.

17. The system of claim 11, wherein:
the vehicle additionally includes an energy-storage device; and
the controller is additionally configured to:
determine a state of charge (SOC) of the energy-storage device, regulate supply of the fuel and air to the engine, motor the engine, heat the catalyst, and channel the generated stream of post-combustion exhaust gas to the HVAC system when the SOC is below a predetermined value.

18. The system of claim 17, wherein the vehicle additionally includes an electric heater configured to supply heat to the cabin when the SOC of the energy-storage device is above the predetermined value and cease supplying heat to the cabin when the SOC of the energy-storage device is below the predetermined value.

19. A method of heating a cabin of a motor vehicle having an internal combustion engine operatively connected to an exhaust system having a catalyst, a motor-generator configured to power the vehicle, and a heating ventilation and air conditioning (HVAC) system, the method comprising:
detecting via a controller a request to increase temperature inside the cabin;
supplying via the controller fuel and air to the engine;
motoring via the controller the engine via the motor-generator to pump the fuel and air into the exhaust system;
heating the catalyst via an electric heating element regulated by the controller to combust the fuel and air inside the catalyst such that a stream of post-combustion exhaust gas is generated; and
channeling via the controller the generated stream of post-combustion exhaust gas to the HVAC system such that a temperature of a coolant circulated through the HVAC system is increased to heat the cabin.

20. The method of claim 19, wherein the vehicle additionally includes an energy-storage device and an electric heater configured to supply heat to the cabin, the method further comprising:
determining a state of charge (SOC) of the energy-storage device via the controller;
supplying heat to the cabin via the electric heater when the SOC of the energy-storage device is above a predetermined value; and
ceasing to supply heat to the cabin via the electric heater when the SOC of the energy-storage device is below the predetermined value;
wherein each of said supplying the fuel and air to the engine, motoring the engine, heating the catalyst, channeling the generated stream of post-combustion exhaust gas to the HVAC system is accomplished when the SOC is below the predetermined value.

* * * * *